United States Patent

Wagner

[11] Patent Number: 5,223,861
[45] Date of Patent: Jun. 29, 1993

[54] EYEGLASS COMBINED WITH SCREWDRIVER APPARATUS

[76] Inventor: Russell R. Wagner, 6511 Robby La., Ravenna, Ohio 44266

[21] Appl. No.: 852,404

[22] Filed: Mar. 16, 1992

[51] Int. Cl.[5] .............................................. G02C 5/14
[52] U.S. Cl. .................................. 351/158; 351/119; 351/111
[58] Field of Search ................. 351/41, 111, 119, 158; 359/810; 2/448, 449, 450

[56] References Cited

U.S. PATENT DOCUMENTS 5,150,261 9/1992 Tsai ...................................... 359/810

Primary Examiner—Rodney B. Bovernick
Attorney, Agent, or Firm—Leon Gilden

[57] ABSTRACT

A screwdriver apparatus is configured as an extension leg of at least one of the respective first and second temple legs of an eyeglass assembly. The extension leg includes a forward distal end threadedly received within a rear distal end of a respective temple leg. A modification of the invention includes accessory hinge screws directed into the forward distal end of the extension leg, as well as a chamber to contain an adhesive fluid to coat an associated hinge screw in an eyeglass hinge assembly.

6 Claims, 3 Drawing Sheets

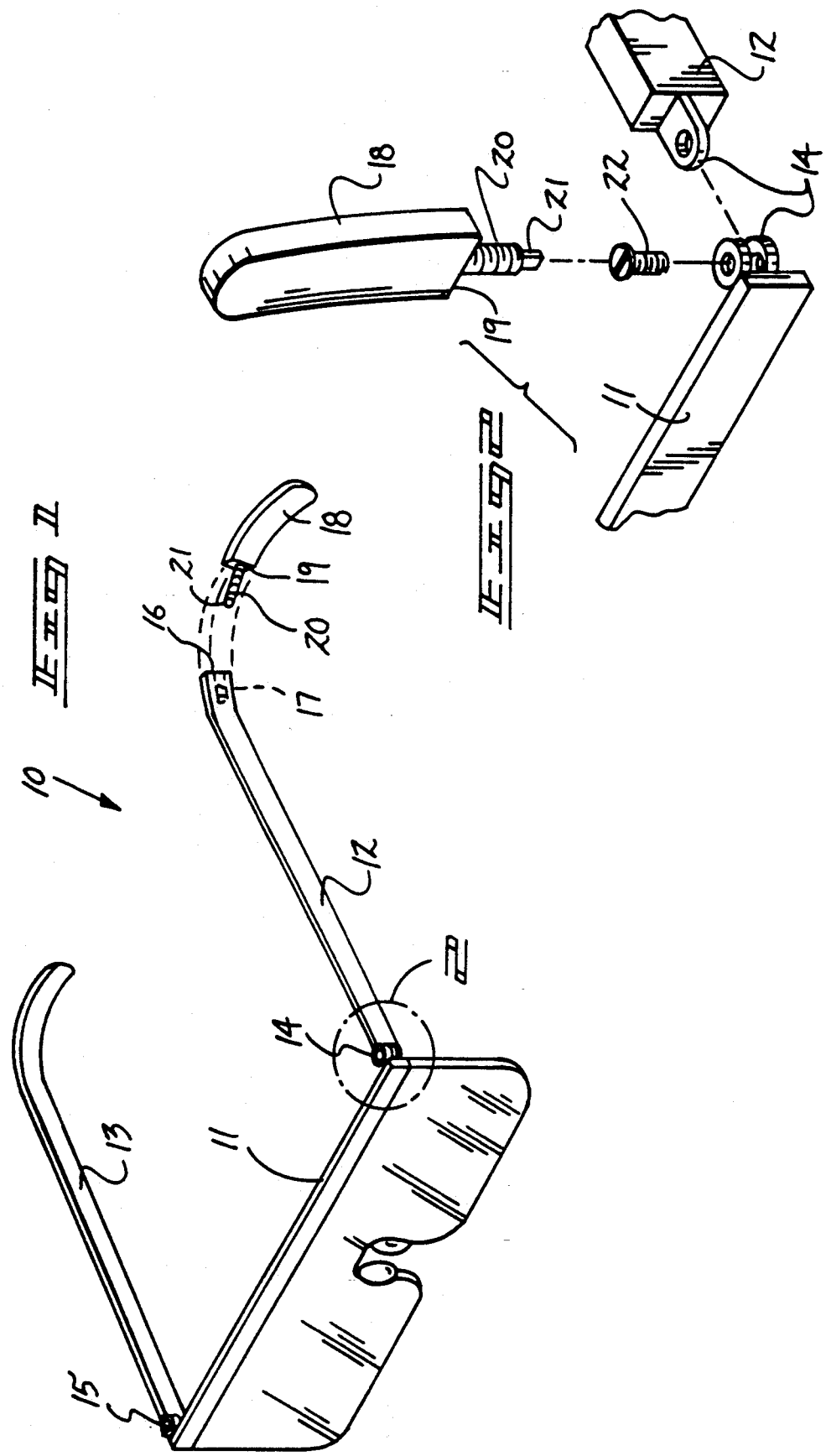

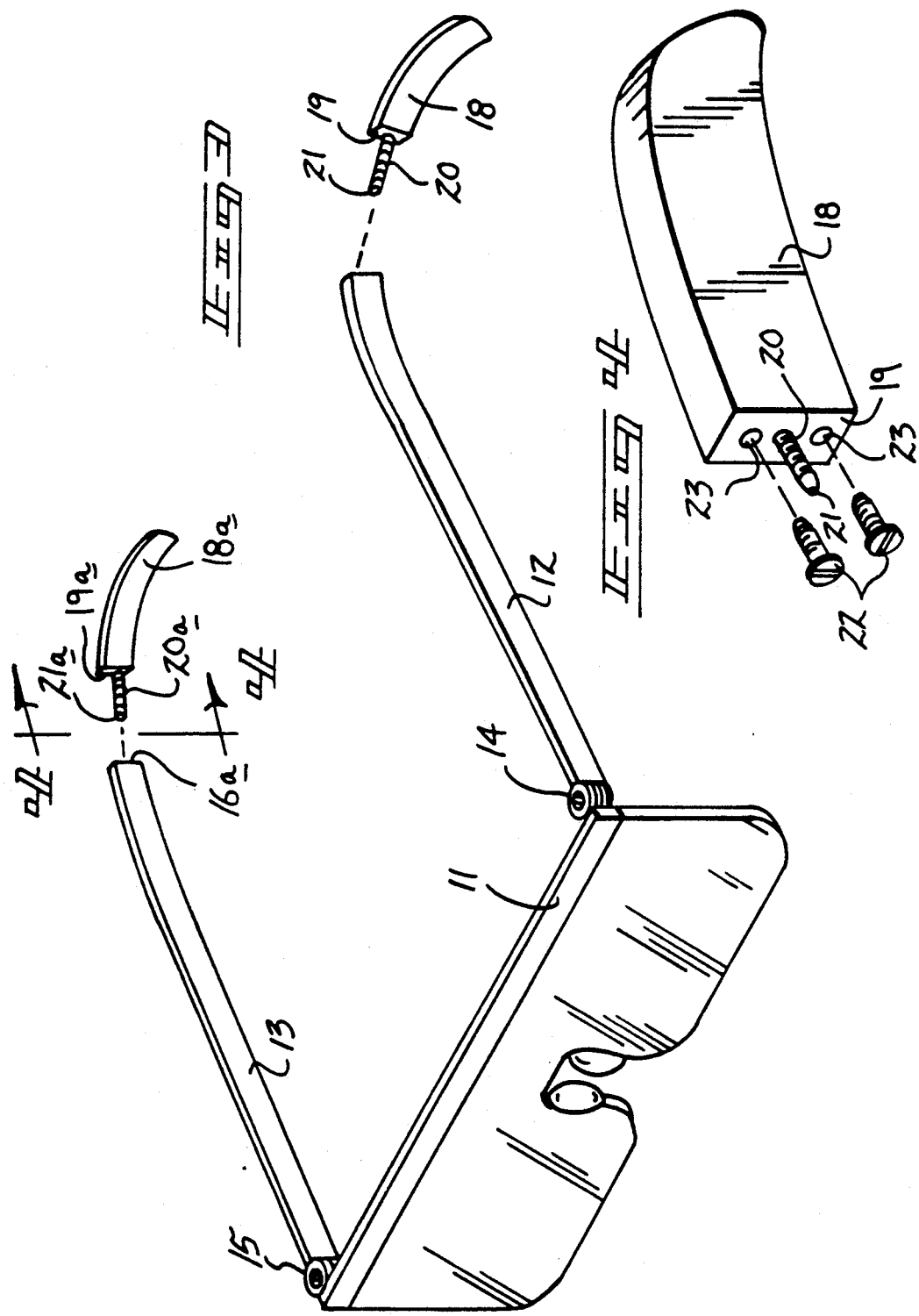

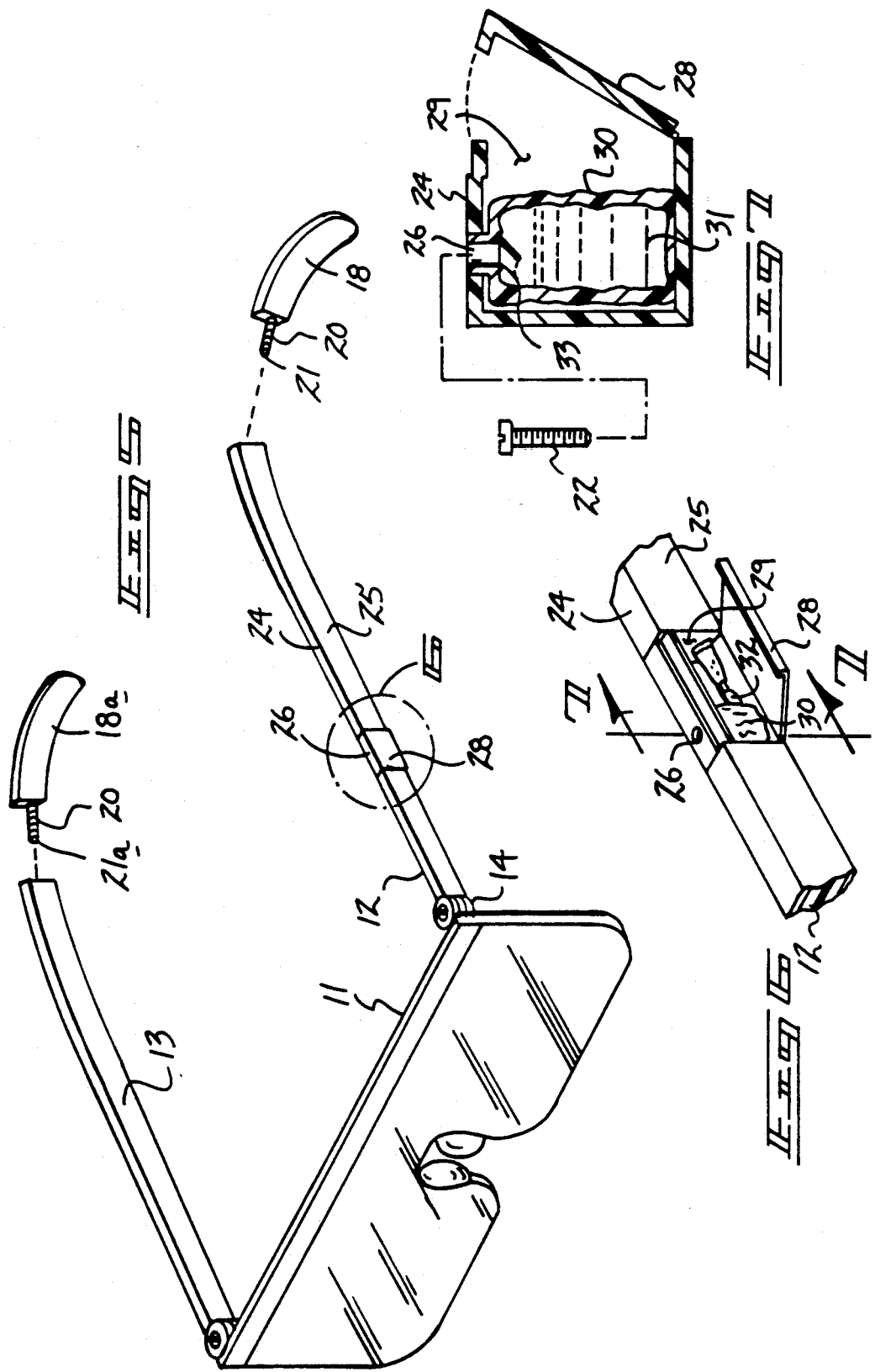

EYEGLASS COMBINED WITH SCREWDRIVER APPARATUS

BACKGROUND OF THE INVENTION

1. Field of the Invention

The field of invention relates to eyeglass apparatus, and more particularly pertains to a new and improved eyeglass screwdriver apparatus wherein the same is arranged and configured with an associated eyeglass frame structure.

2. Description of the Prior Art

Typically, the eyeglass hinge screws are availed of displacement relative to an associated hinge, wherein the resecurement of such a hinge screw forces individuals to seek an appropriately sized screwdriver to effect this function. The instant invention attempts to overcome deficiencies of the prior art by providing eyeglass assembly with conveniently mounted screwdriver thereto.

A prior art device as set forth in U.S. Pat. No. 4,950,066 to Hartman sets forth an eyeglass having various components mounted and dismounted relative to the eyeglass assembly to permit rapid interchange of lenses and associated decorative elements relative to the eyeglass assembly.

As such, it may be appreciated that there continues to be a need for a new and improved eyeglass screwdriver apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of eyeglass apparatus now present in the prior art, the present invention provides an eyeglass screwdriver apparatus wherein the same is arranged and formed as a component of an eyeglass framework. As such, the general purpose of the present invention, which will be described subsequently in greater detail, is to provide a new and improved eyeglass screwdriver apparatus which has all the advantages of the prior art eyeglass apparatus and none of the disadvantages.

To attain this, the present invention provides a screwdriver apparatus configured as an extension leg of at least one of the respective first and second temple legs of an eyeglass assembly. The extension leg includes a forward distal end threadedly received within a rear distal end of a respective temple leg. A modification of the invention includes accessory hinge screws directed into the forward distal end of the extension leg, as well as a chamber to contain an adhesive fluid to coat an associated hinge screw in an eyeglass hinge assembly.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art Who are not familiar with patent or legal terms or Phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eyeglass screwdriver apparatus which has all the advantages of the prior art eyeglass apparatus and none of the disadvantages.

It is another object of the present invention to provide a new and improved eyeglass screwdriver apparatus which may be easily and efficiently manufactured and marketed.

It is a further object of the present invention to provide a new and improved eyeglass screwdriver apparatus which is of a durable and reliable construction.

An even further object of the present invention is to provide a new and improved eyeglass screwdriver apparatus which is susceptible of a low cost of manufacture with regard to both materials and labor, and which accordingly is then susceptible of low prices of sale to the consuming public, thereby making such eyeglass screwdriver apparatus economically available to the buying public.

Still yet another object of the present invention is to provide a new and improved eyeglass screwdriver apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric exploded view of the first hinge utilizing the extension leg screwdriver portion of the invention.

FIG. 3 is an isometric illustration of the invention utilizing a plurality of screwdriver extension legs of variously sized screwdriver members.

FIG. 4 is an isometric illustration of a modified extension leg structure.

FIG. 5 is an isometric illustration of a further modified eyeglass assembly.

FIG. 6 is an isometric partial view of the section 6 as set forth in FIG. 5.

FIG. 7 is an orthographic view, taken along the lines 7—7 of FIG. 6 in the direction indicated by the arrows.

DESCRIPTION OF THE PREFERRED EMBODIMENT

With reference now to the drawings, and in particular to FIGS. 1 to 7 thereof, a new and improved eyeglass screwdriver apparatus embodying the principles and concepts of the present invention and generally designated by the reference numeral 10 will be described.

More specifically, the eyeglass screwdriver apparatus 10 of the instant invention essentially comprises an eyeglass frame 11, including a first temple leg 12 and a second temple leg 13 hingedly mounted to the eyeglass frame 11 at opposed distal ends of the eyeglass frame 11 about a respective first and second hinge 14 and 15. The first temple leg includes a first temple leg rear distal end 16, with a threaded bore 17 directed into the first temple leg originating from the first temple leg rear distal end 16. A first temple leg extension leg 18 is arranged for securement to the first temple leg rear distal end 16 about a threaded rod 20 fixedly projecting forwardly of the forward distal end 19, with the threaded rod 20 terminating in a screwdriver blade 21. In this manner, removal of the extension leg 18 permits access to the screwdriver blade 21 to permit securement of a hinge screw 22 relative to an associated hinge 14, as exemplified in FIG. 2 for example.

FIG. 3 illustrates the use of a second extension leg 18a that includes a second forward distal end 19a arranged for mounting to the second temple leg rear distal end 16a, wherein a like threaded bore 17 is directed into the second temple leg rear distal end to receive a second temple leg threaded rod 20 that includes a second screwdriver blade 21a. Typically, the second screwdriver blade 21a is of a second width at variance to a first width of the screwdriver blade 21 to Permit access to variously sized hinge screws 22.

The FIG. 4 illustrates the use of the extension leg 18 to include at least one, and preferably a plurality, of extension leg bores 23 directed into the first temple leg forward distal end 19, with each extension leg bore 23 receiving a hinge screw 22 therewithin for replacement of a lost hinge screw relative to an associated temple leg hinge.

FIG. 5 illustrates the apparatus further including the first temple leg including a first temple leg top wall 24 and a first temple leg outer wall 25. The first temple leg top wall 24 includes a top wall bore 26 directed into a chamber 29 within the first temple leg. The first temple leg outer wall 25 includes an outer wall door 28 hingedly mounted to the first temple leg for access to the chamber 29. An adhesive fluid reservoir 30 positioned within the chamber 30 including an adhesive fluid 31 therewithin. A reservoir nozzle 32 mounted to the fluid reservoir 30 permits replenishment of the fluid reservoir with the adhesive fluid 31 A resiliently biased reservoir valve plate 33 is mounted within the reservoir below the top wall bore 26 to effect sealing of the adhesive fluid during Periods of non-use.

To permit positioning of the adhesive fluid onto the hinge screw 22, the hinge screw 22 is merely directed into the top wall bore 26 to apply a quantity of adhesive to the hinge screw, whereupon in subsequent directing into an associated hinge such as the first or second hinge 14 and 15 provides for a permanent securement of the associated hinge screw relative to a hinge to minimize future loss and dislodgement of the hinge screw.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An eyeglass frame, the eyeglass frame including a frame first distal end and a frame second distal end, the frame first distal end mounting a first hinge, the frame second distal end mounting a second hinge, a first temple leg hingedly mounted to the first hinge, a second temple leg hingedly mounted to the second hinge, and the first temple leg including a planar first temple leg rear distal end, and a first extension leg selectively securable to the first temple leg rear distal end, the first extension leg including a first temple leg planar forward distal end arranged for complementary and contiguous communication with the first temple leg rear distal end, and the first temple leg forward distal end including a threaded rod fixedly mounted to the first temple leg forward distal end, and the threaded rod including a screwdriver blade mounted at a free distal end of the threaded rod spaced from the first temple leg forward distal end, and the first temple leg rear distal end including a first temple leg threaded bore directed into the first temple leg from the first temple leg rear distal end, and the threaded rod and the screwdriver blade threadedly received within the first temple leg rear distal end threaded bore.

2. An apparatus as set forth in claim 1 wherein the first temple leg forward distal end includes at least one extension leg bore directed into the extension leg from the extension leg forward distal end, and the extension leg bore complementarily receiving a hinge screw therewithin.

3. An apparatus as set forth in claim 2 wherein the first temple leg includes a first temple leg top wall and a first temple leg outer wall, wherein the top wall includes a top wall bore directed into the first temple leg, and a chamber positioned within the first temple leg in communication with the top wall bore, and an outer wall door hingedly mounted to the first temple leg adjacent the chamber.

4. An apparatus as set forth in claim 3 wherein the chamber includes an adhesive fluid reservoir positioned within the chamber, wherein the adhesive fluid reservoir is positioned below and in communication with the top wall bore, the adhesive fluid reservoir including an adhesive fluid contained therewithin.

5. An apparatus as set forth in claim 4 wherein the adhesive fluid reservoir includes a reservoir nozzle mounted to the adhesive fluid reservoir for selective filling of the adhesive fluid reservoir with said adhesive fluid.

6. An apparatus as set forth in claim 5 wherein the adhesive fluid reservoir includes a resiliently biased reservoir valve plate positioned within the adhesive fluid reservoir at a lower distal end of the top wall bore.

* * * * *

Adverse Decision in Interference

Patent No. 5,223,861, Russell R. Wagner, EYEGLASS COMBINED WITH SCREWDRIVER APPARATUS, Interference No. 103,467, final judgment adverse to the patentee rendered June 29, 2000, as to claims 1-3.